(12) United States Patent
Güllich

(10) Patent No.: US 7,505,242 B2
(45) Date of Patent: Mar. 17, 2009

(54) METHOD FOR APPLYING A MAGNETIC MARK TO A ROTATABLE ARTICLE TO BE POSITIONED AND CORRESPONDING DEVICE

(75) Inventor: Peter Güllich, Münster (DE)

(73) Assignee: Schenck RoTec GmbH, Darmstadt (DE)

( * ) Notice: Subject to any disclaimer, the term of this patent is extended or adjusted under 35 U.S.C. 154(b) by 499 days.

(21) Appl. No.: 11/128,745

(22) Filed: May 13, 2005

(65) Prior Publication Data

US 2005/0259377 A1    Nov. 24, 2005

(30) Foreign Application Priority Data

May 14, 2004  (DE) .................... 10 2004 024 406

(51) Int. Cl.
G01M 1/16 (2006.01)
G01M 1/22 (2006.01)

(52) U.S. Cl. ................ 361/143; 73/462; 73/660; 324/173; 324/179

(58) Field of Classification Search ........... 361/143; 73/462, 660; 324/173, 179
See application file for complete search history.

(56) References Cited

U.S. PATENT DOCUMENTS

| | | | | |
|---|---|---|---|---|
| 3,555,464 A | * | 1/1971 | Maeda et al. | 333/185 |
| 4,064,704 A | * | 12/1977 | Blackburn | 73/660 |
| 4,214,481 A | * | 7/1980 | Reutlinger | 73/462 |
| 5,895,854 A | | 4/1999 | Becherer et al. | |
| 6,584,838 B2 | * | 7/2003 | Lorenzen | 73/314 |
| 6,954,685 B2 | * | 10/2005 | Altieri et al. | 701/3 |

FOREIGN PATENT DOCUMENTS

| | | | |
|---|---|---|---|
| DE | 1 103 637 | | 3/1961 |
| DE | 25 58 159 A1 | | 6/1977 |
| DE | 28 39 819 | | 3/1980 |
| DE | 36 00 306 A1 | | 8/1986 |
| DE | 196 46 251 A1 | | 5/1998 |
| DE | 197 33 885 A1 | | 2/1999 |
| GB | 2 169 712 A | | 7/1986 |
| GB | 2169712 | * | 7/1996 |
| JP | 63182808 | | 7/1988 |
| JP | 402108987 A | * | 10/1988 |
| JP | 01189517 A | | 7/1989 |
| JP | 04337401 A | | 11/1992 |

OTHER PUBLICATIONS

Search Report of European Patent Office.

* cited by examiner

*Primary Examiner*—Michael J Sherry
*Assistant Examiner*—Zeev Kitov
(74) *Attorney, Agent, or Firm*—Collard & Roe, P.C.

(57) ABSTRACT

The invention relates to a method for applying a magnetic mark to a rotatable article (1) to be positioned, to a corresponding device and to a system (2) consisting of a device for applying a magnetic mark and a device (25) for determining the angle of rotation. In the region that comprises magnetizable material of the rotatable article to be positioned and is selected for determining the angle of rotation, a magnetic dipole is generated as a magnetic mark by a magnetic field, by means of the device for applying a magnetic mark. Said mark is used for determining the angle of rotation of the rotor.

19 Claims, 3 Drawing Sheets

METHOD FOR APPLYING A MAGNETIC MARK TO A ROTATABLE ARTICLE TO BE POSITIONED AND CORRESPONDING DEVICE

The invention relates to a method for applying a magnetic mark to a rotatable article to be positioned for determining angles of rotation, rotational speeds or rotational properties, to a device for applying a magnetic mark to a rotatable article to be positioned and to a system consisting of a device for applying magnetic marks and a device for determining the angle of rotation.

Methods and devices of the aforementioned type are known wherein the mark denotes an angle reference system that is attached to the article. Methods and devices of this type are used for balancing articles. The article is also referred to as a rotor. Such marks may be of an optical, magnetic or mechanical type. A color marking, for example, which may be optically detected, is applied to the rotor. An optical mark may not be used in cases in which the rotor is mounted in an optically impermeable environment or an environment that markedly alters the optical path. Small permanent magnets, which are fastened to the rotor, are generally used as magnetic marks. However, this leads to a change in the mass distribution on the rotor and influences the balancing of the rotor.

DE-AS 1 103 637 discloses a method for generating square wave voltages for measuring and evaluating devices of balancing machines wherein a mark of a rotor is photoelectrically or electromagnetically scanned. Two square wave voltages, which are mutually out-of-phase by 90°, are exactly square in form and the shape of which is independent of the frequency of the spike pulse, are derived from the spike pulse-shaped scanning voltages.

DE-OS 25 58 159 discloses a method for producing locally delimited magnetizations, for example for coding purposes in information carriers, magnetic keys, magnetic identification devices and the like, and also a corresponding device. With the method described in said document, at the point to be magnetized, a conductor loop, which is bent in the shape of a hairpin with a narrow radius, is placed by its tip substantially at a right angle on the surface of the body made of magnetizable material and, as a result of being acted on by the magnetizing current, a magnetic dipole having a very small pole spacing is generated in a layer of the body in proximity to the surface. A high information density is thus achieved in the body. However, the document does not refer to methods and devices for applying magnetic marks to a rotatable article to be positioned for determining angles of rotation.

The object of the invention is to provide a method of the aforementioned type that allows the angle of rotation of the rotatable article to be positioned to be determined in a contactless manner in different environments and at the same time avoids the problems of a mark that is affected by mass. Problems associated with mechanically coupled devices for determining angles of rotation, connected with slippage by belt drives, for example, should also be avoided.

According to the method of the invention, this object is achieved in that a region, which is suitable for determining angles of rotation, comprising magnetizable material of the article is selected and, in this region, a magnetic dipole that is rotationally symmetrical to the axis of rotation of the article is generated as a magnetic mark by a magnetic field. According to the invention, the object is also achieved by a device that comprises means for generating a magnetic field that, in a region of the rotatable article comprising magnetizable material to be positioned that is provided for determining angles of rotation, generate as a magnetic mark a magnetic dipole that is rotationally symmetrical to the axis of rotation of the article. According to the invention, a system consisting of this device for applying magnetic marks and a device for determining the angle of rotation also achieves the object in that the device for applying magnetic marks, viewed from the rotatable article to be positioned toward the axis of rotation, is arranged before the device for determining the angle of rotation.

The method according to the invention and the device according to the invention thus advantageously utilize the property exhibited by rotatable articles (rotors) to be positioned, of being made of a highly magnetizable material, for example ferromagnetic material. In a highly advantageous and surprising manner, a region of the rotating article to be positioned itself becomes a mark that may be used for determining angles of rotation. The mass of the rotor does not change. The mark may also advantageously be detected by the system according to the invention in a contactless manner and allows, as a result of the position of the dipole, the angle of rotation of the rotor to be determined in order to position the rotor for balancing. There is no need for further measurement values to be detected. The problems associated with slippage resulting from belt drives or other mechanical devices for determining the angle of rotation may therefore be avoided by the method according to the invention and the device according to the invention in an advantageous manner.

The measures recited in the dependent claims allow advantageous developments of and improvements to the articles specified in the independent claims. The magnetic field is particularly advantageously generated by a current-carrying conductor loop, as the mark shape and the field strength of the magnetic field generated by the mark may thus be adjusted by means of the parameters of the current pulse.

An embodiment of the device according to the invention that is advantageous for the detection of magnetic marks consists in the fact that, in its end that is closest to the rotatable article to be positioned, the current-carrying conductor loop is arranged in a plane that extends substantially perpendicularly to the axis of rotation of the article. The device according to the invention may be produced simply and cost-effectively if the current-carrying conductor loop is arranged in a groove in a ceramic plate extending substantially parallel to a plate surface plane, the ceramic plate being arranged at the end face of the device that opposes the rotatable article to be positioned and extending substantially perpendicularly to the axis of rotation of the article. A mark on the rotatable article to be positioned that is particularly suitable for determining angles of rotation is generated if the current-carrying conductor loop substantially assumes the shape of a horizontal eight. Advantageously, the device for applying a magnetic mark also comprises a controller, which controls the pulse duration and the pulse shape, as well as the current strength of the current pulse that flows through the conductor for generating the magnetic field, and is connected to the conductor loop. This allows the current pulse, which flows through the conductor loop and generates the magnetic mark in the rotor, to be influenced such that, in accordance with the respective rotor shape, an optical mark for determining the form and magnetic field strength of the angle of rotation is generated. Once the balancing process has been completed, the current-carrying conductor loop may also particularly advantageously be used for eliminating the mark. This should allow any adverse effects of the magnetized rotor to be avoided in proper use of the rotor. The development according to the invention of the device provides a very simple option for this purpose. For eliminating the mark on the rotor, the controller advantageously generates the electrical alternating currents having the necessary amplitude and frequency required for eliminating the mark.

The system according to the invention consisting of the device for applying magnetic marks and the device for determining the angle of rotation advantageously comprises two mutually offset magnetic field sensors, from the signals of which a signal processing device determines the current angle of rotation of the rotatable article to be positioned. The signals that are generated by the magnetic field sensor and are dependent on the position of the mark allow the current angle of rotation to be directly determined if the magnetic field sensors are mutually offset approximately by an angle of rotation of 90°. Sine and cosine functions, which lead via the arc tangent (arctan) function to the angle of rotation, are then generated by the magnetic field sensors. A further advantageous use of the system according to the invention may be provided if the device for determining the angle of rotation also comprises a device for determining the rotational speed. In order advantageously to minimize the mechanical wear to the device for determining the angle of rotation and the device for applying a magnetic mark, abrasion-resistant ceramic materials are advantageously used at the end face of the respective device. The device for determining the angle of rotation is advantageously manually oriented by applying a visible marking. In order, during balancing, to position the rotatable article to be positioned for applying balancing masses or for removing masses for eliminating imbalance, the system according to the invention cooperates with a device that rotates the article to be balanced. The system may advantageously be configured in a modular manner in that the device for applying a magnetic mark is detachable.

The invention will be described below in greater detail with reference to embodiments that are illustrated in the drawings, in which.

Figure 1:
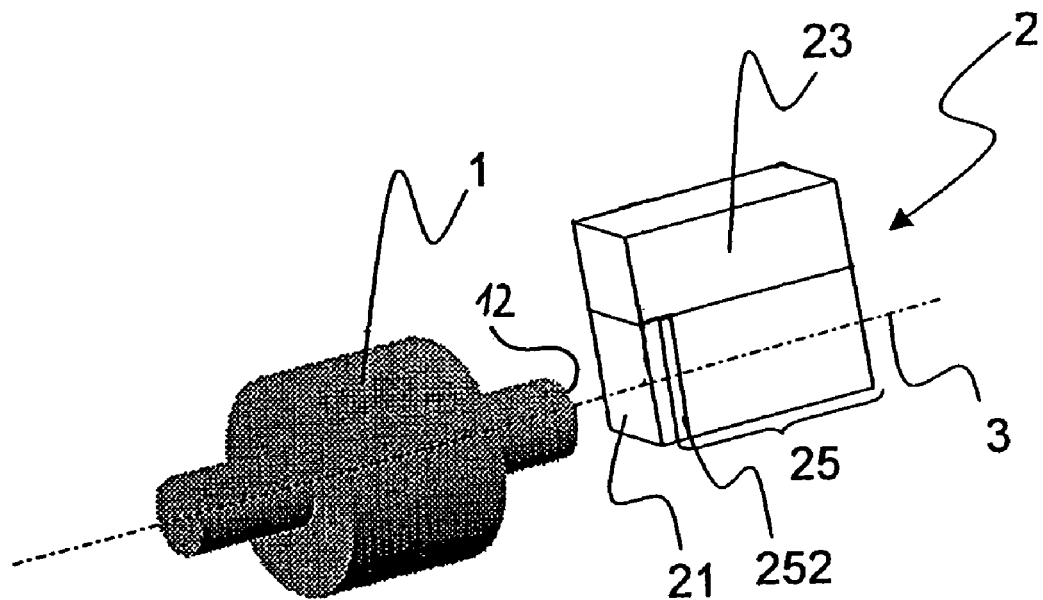
FIG. 1 is a schematic, perspective, lateral view of an article to be balanced and a system according to the invention consisting of a device according to the invention for applying a magnetic mark and a device for determining the angle of rotation.
Figure 2:
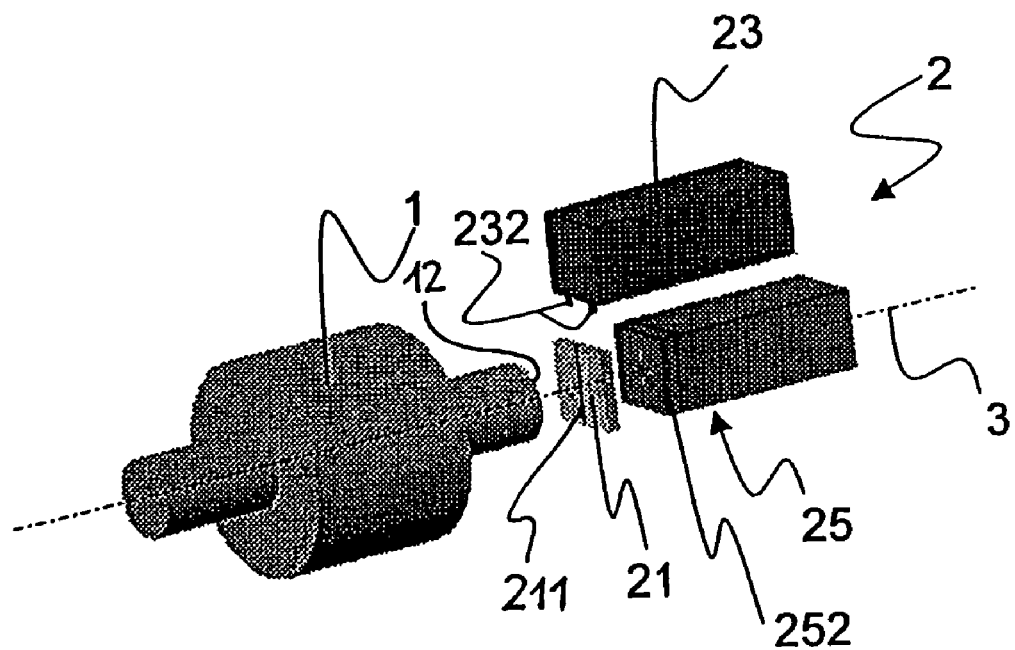
FIG. 2 is a perspective, lateral view of an article to be balanced and a schematic, exploded, perspective, lateral view of the system of the invention according to FIG. 1.
Figure 4:
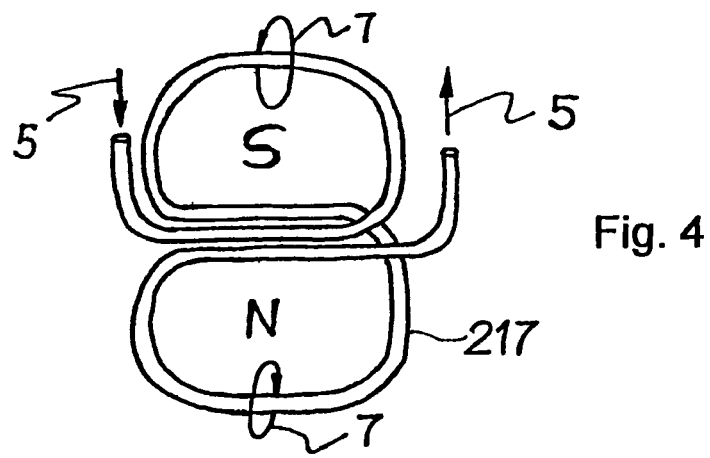
Figure 5:
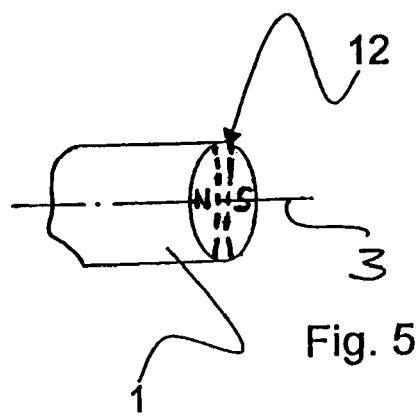
Figure 6:
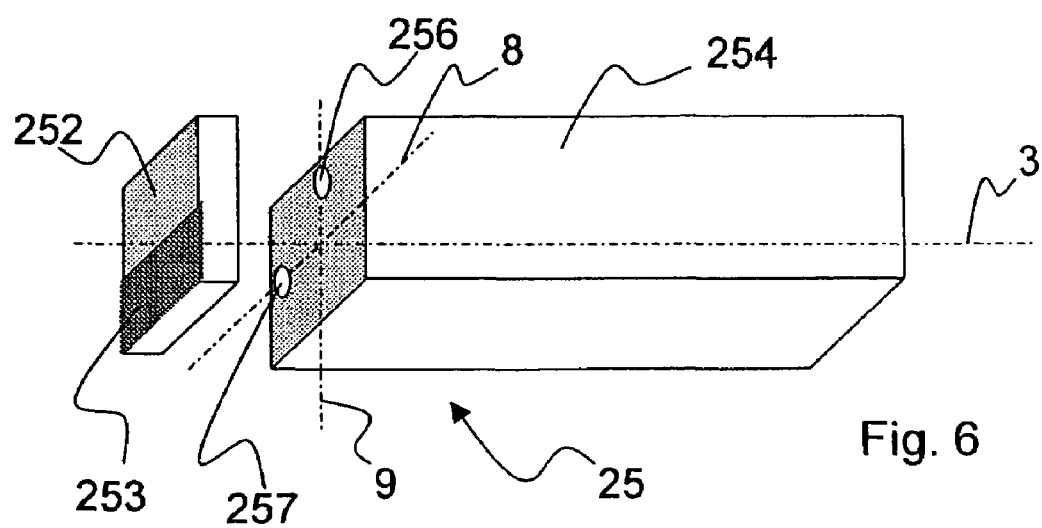
Figure 7:
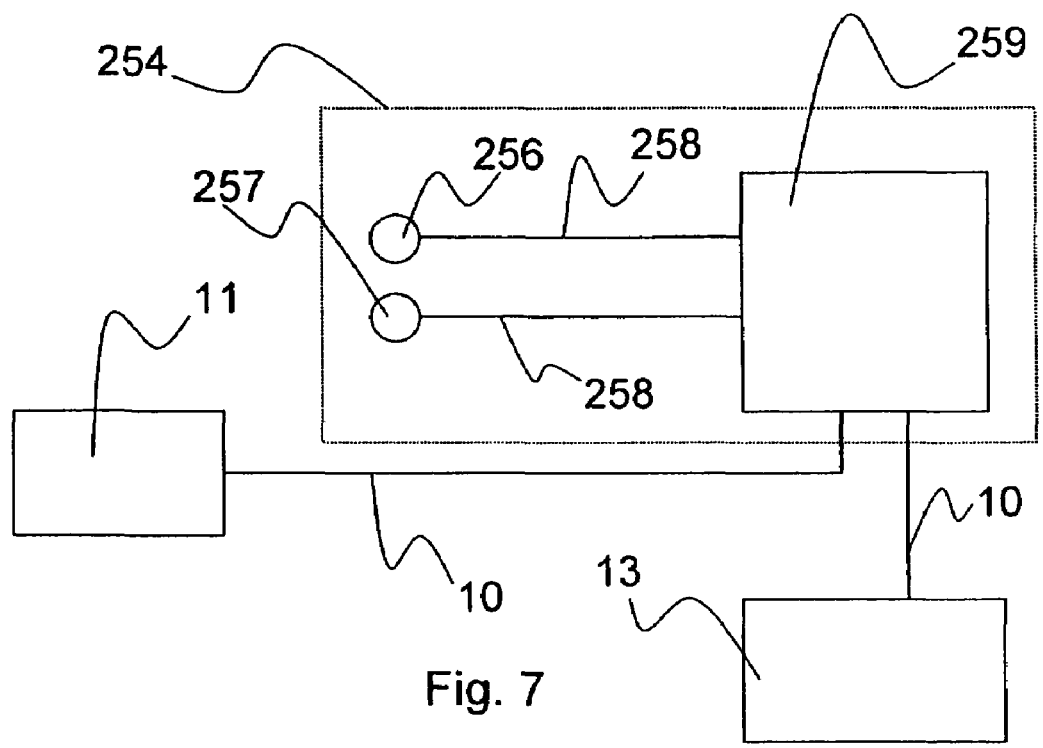

FIG. 4 of a second embodiment of a current-carrying conductor loop, of a device according to the invention for applying a magnetic mark;

FIG. 5 is a schematic, perspective view of the end of the article to be balanced that opposes the device according to the invention for applying a magnetic mark or a system according to the invention consisting of a device for applying a magnetic mark and a device for determining the angle of rotation;

FIG. 6 is a schematic, exploded, perspective, lateral view of the device illustrated in FIGS. 1 and 2 for determining the angle of rotation of a system according to the invention; and FIG. 7 is a circuit diagram of a device for determining the angle of rotation of a system according to the invention consisting of a device for applying a magnetic mark and a device for determining the angle of rotation, with devices connected thereto for rotating the article to be balanced and also for calibration and parameterization.

FIG. 1 shows the article 1 to be balanced, which is also referred to as a rotor. The rotor 1 is supported in a mount (not shown in FIG. 1) or a balancing machine. Along the axis of rotation 3 of the rotor 1, the system 2 according to the invention, which consists of a device for applying a magnetic mark and the device 25 for determining the angle of rotation, opposes the rotor. The device for applying a magnetic mark consists of a ceramic plate 21 comprising a current-carrying conductor loop (not shown) and a controller 23. The current-carrying conductor loop, arranged on or inside the ceramic plate 21, is electrically connected to the controller 23, which is used for controlling the current pulse flowing through the conductor loop using the parameters of the current strength, pulse shape and pulse duration. A magnetic field, which generates a magnetization in regions, in proximity to the surface, of the end face 12 of the rotor 1 that faces the system 2, is generated by means of the current-carrying conductor loop. For this purpose, this end face 12 has to be made of a magnetizable material, in particular a ferromagnetic material such as iron, nickel, cobalt or what is known as a Heusler alloy.

The end face 12 of the rotor 1 is used for determining angles of rotation, and the magnetization introduced into this end face serves as a magnetic mark for determining this angle of rotation. This mark may also be used for rotating the rotor into a position having a predetermined angle of rotation.

FIG. 1 also shows that the device 25 for determining the angle of rotation comprises ceramic material 252, in the form of a ceramic plate, on its end face facing the rotor 1.

FIG. 2 is a further exploded illustration of the system 2 according to the invention. It may be seen that the system 2 is configured in a modular manner, so the device 23, 21 for applying a magnetic mark may optionally be used without the device 25 for determining the angle of rotation, simply for applying the magnetic mark to the end face 12 of the rotor 1. For producing an electrical connection between the controller 23 and the current-carrying conductor loop of the ceramic plate 21, terminals 232, which are inserted into recesses (not shown) in the ceramic plate 21, are provided on the controller 23. As the device 25 for determining the angle of rotation may be used independently of the device 23, 21 for applying the magnetic mark, said device 25 has an end face 252 made of ceramic material that is abrasion-resistant and minimizes mechanical damage to the device 25 for determining the angle of rotation by means of the rotor 1. The purpose of the ceramic plate 21 is to prevent destruction of the device 21, 23 for applying a magnetic mark and also to insulate the current-carrying conductor loop from the environment.

It may also be seen in FIG. 2 that the ceramic plate 21 comprises a groove 211, in which, in a first embodiment, the current-carrying conductor loop is provided in the form of a wire laid along the groove. In this case, the current-carrying conductor loop extends along a straight line that is perpendicular to the axis of rotation 3 of the rotor 1.

Figure 3:
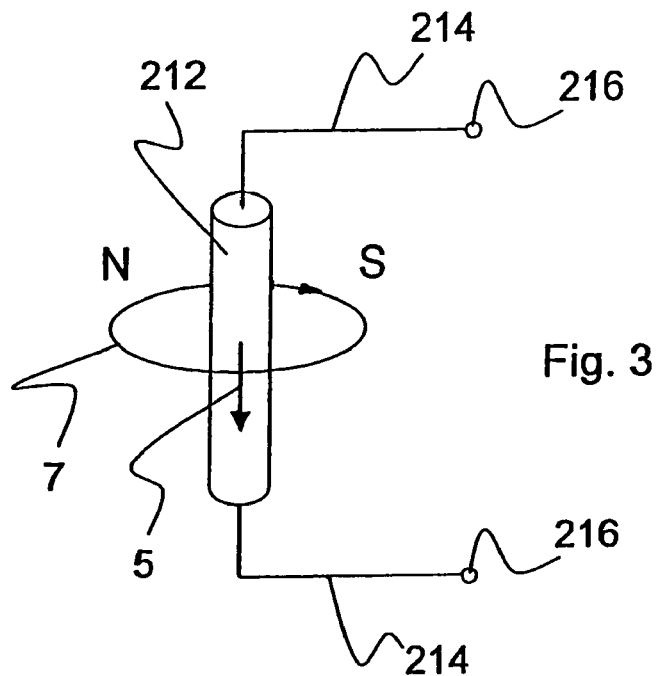
FIG. 3 is a respective schematic, perspective, lateral view of a first.

FIG. 3 schematically shows a conductor loop of this type. The conductor 212, through which a current flows in a direction 5, generates a magnetic field, the course of the line of flux of which is indicated by the arrow on the circular line 7, about this conductor loop. The direction of the magnetic field generated by a current-carrying conductor is described by Biot-Savart's law. The polarity of the magnetic field is illustrated in FIG. 3 by the letters "N" and "S", which stand for north and south. The current-carrying conductor 212 is connected to the power supply via the controller 23 shown in FIGS. 1 and 2 by means of the connection lines 214 and the terminals 216.

FIG. 4 shows a further embodiment of a current-carrying conductor. The current-carrying conductor 217 has the shape of a horizontal eight, power being respectively supplied and discharged at the median line of the horizontal eight and the current passing through the two circular portions of the horizontal eight in different directions (clockwise and counterclockwise). Magnetic poles of different polarity, which are illustrated by the letters "S" and "N", are accordingly generated in the interiors of the two circular portions of the horizontal eight. The current-carrying conductors 212 and 217 may be embedded into the ceramic plate 21 or arranged at least partially on the surface of this ceramic plate 21. For this purpose, the ceramic plate 21 may comprise a correspondingly formed recess or groove. In the case of the configuration of the current-carrying conductor in the shape of a horizontal eight, said eight is arranged in the groove such that the web of the eight follows the course of the groove. In a preferred embodiment, the ceramic plate 21 receiving the current-carrying conductors 212 and 217 may be selected from a set comprising different plate sizes, which are associated in each case with rotor diameter regions.

FIG. 5 shows the magnetic mark on the end face 12 of the shaft of the rotor 1. A magnetic dipole, characterized by the polarities in "N" and "S", has been rotationally symmetrically magnetized in the regions, in proximity to the surface, of the end face 12 by the magnetic field of the current-carrying conductor of the described device for applying a magnetic mark. The transition region between the magnetic poles forms a narrow line that is illustrated in FIG. 5 by dot-dash demarcation lines and intersects the axis of rotation 3. The magnetized mark may then be used for determining the angle of rotation of the rotor 1. The magnetization process has not changed the mass of the rotor. The rotor may therefore subsequently be balanced without a change in mass of the rotor having to be taken into account. This allows the position of the magnetic mark to be determined by a sensor operating in a contactless manner that is arranged in the device 25 for determining the angle of rotation.

In a further embodiment, the magnetic mark may be generated in a manner similar to the above-explained method, using a permanent magnet instead of a current-carrying conductor. However, because a current-carrying conductor allows a higher and more variable magnetic field strength to be achieved, the application of this method is preferred.

The construction and the mode of operation of the device for determining the angle of rotation will be described in greater detail with reference to FIGS. 6 and 7. FIG. 6 is an exploded illustration of the device 25 for determining the angle of rotation comprising the ceramic plate 252 and the signal receiving and processing device 254. The ceramic plate 252 is arranged before the side of the signal receiving and processing device 254 that faces the rotor and comprises a region made of ceramic material 253, the color of which has been altered. The demarcation line between the regions of different color is located on the median line and is a visible marking. It is used for manually orienting the device with respect to the rotor.

The magnetic field sensors 256 and 257 are arranged along the median lines 8 and 9 of the end face of the signal receiving and processing device 254 that faces the rotor, the first magnetic field sensor 256 being offset from the second magnetic field sensor 257 by an angle of 90°. The magnetic field sensors are preferably high-sensitivity magneto-resistive sensors. In a further embodiment, the magnetic field sensors may also be configured as Hall sensors.

As shown in FIG. 7, the magnetic field sensors 256 and 257 are connected to the signal processing device 259 via connection lines 258. The analog sine and cosine signals, which are generated as a result of the magnetic field sensors 256 and 257 being offset by 90°, are initially amplified in an amplification and balancing stage by the signal processing device 259. Digital incremental signals, which directly represent the current angle of rotation of the rotor, are then generated by a known interpolation ASIC. In this case, the offset, amplitude or phase shift between the sine signal and cosine signal is automatically corrected within narrow limits by the interpolation ASIC. A crude parameterization or calibration may be undertaken using a calibration and parameterization device 13, for example a laptop, which is connected to the signal processing device 259 via a connection line 10. The signal processing device 259 is also connected via a connection line 10 to a device for rotating the article 11 to be balanced. This rotary device 11 allows the article to be balanced to be moved in a controlled manner into a position having a specific angle of rotation by the device 25 for determining the angle of rotation. In such a position, the rotor 1 may be balanced by adding or removing mass therefrom or thereto.

In a further embodiment, the rotational speed of the rotor 1 may be determined, using the signal processing device 259, from the sine and cosine signals obtained from the magnetic field sensor 256 and 257. The rotational properties may also be detected.

The invention claimed is:

1. A method for applying a magnetic mark to a rotatable article having an axis of rotation and to be positioned for determining angles of rotation, rotational speeds or rotational properties, wherein, in a region of the article that is made of a magnetizable material and is suitable for determining the angle or rotation, one single magnetic dipole, two poles of which are arranged symmetrically to a symmetry axis which coincides with the axis of rotation of the article, is generated by a magnetic field as the magnetic mark, wherein two mutually offset magnetic field sensors are placed adjacent the front face of the rotatable article for generating analog signals in response to the magnetic dipole magnetized in the rotatable article, and an angle of rotation of the rotatable article is determined from the analog signals by using a signal receiving and processing device connected to said magnetic field sensors.

2. The method as claimed in claim 1, wherein the magnetic field is generated by a current-carrying conductor loop.

3. The method as claimed in claim 2, wherein, once the balancing process has been completed, the current-carrying conductor loop is also used for eliminating the mark.

4. A system comprising a first device for applying a magnetic mark to a rotatable article to be positioned for determining angles of rotation, the first device comprising means for generating a magnetic dipole that is central-symmetrical to the axis of rotation of the rotatable article, in a front face region of the rotatable article that is made of a magnetizable material and is provided for determining angles of rotation, and a second device for determining the angle of rotation of the rotatable article with said mark, wherein said first device, when viewed from a side to be placed at the rotatable article, is arranged in front of the second device, wherein the second device comprises two mutually offset magnetic field sensors for generating analog signals in response to the magnetic dipole magnetized in the rotatable article, and a signal processing device designed to receive said analog signals and to determine any angle of rotation of the rotatable article from said analog signals.

5. The system as claimed in claim 4, wherein a current-carrying conductor loop is used as the means for generating a magnetic dipole.

6. The system as claimed in claim 5, wherein the current-carrying conductor loop is arranged, in its end that is closest to the rotatable article to be positioned, in a plane extending substantially perpendicularly to the axis of rotation of the article.

7. The system as claimed in claim 5, wherein the current-carrying conductor loop is arranged in a linear groove in a ceramic plate extending substantially parallel to a plate surface plane, the ceramic plate being arranged at the end face of the device opposing the article and extending substantially perpendicularly to the axis of rotation of the rotatable article to be positioned.

8. The system as claimed in claim 6, wherein the current-carrying conductor loop substantially assumes the shape of a horizontal eight.

9. The system as claimed in claim 5, further comprising a controller, which controls the pulse duration and the pulse shape, as well as the current strength of the current pulse that flows through the conductor for generating the magnetic field, and is connected to the conductor loop.

10. The system as claimed in claim 9, wherein the controller also generates the electrical alternating currents, having the necessary amplitude and frequency, required for eliminating the mark.

11. The system as claimed in claim 4, wherein the two magnetic field sensors are mutually offset substantially by an angle of rotation of 90°.

12. The system as claimed in claim 4, wherein the second device for determining the angle of rotation also comprises means for determining the rotational speed.

13. The system as claimed in claim 4, wherein the end face of the second device for determining the angle or rotation that is directed toward the article is made of a ceramic material.

14. The system as claimed in claim 4, wherein the end face of the second device for determining the angle of rotation that is directed toward the article has a visible marking for manually orienting this device.

15. The system as claimed in claim 4, wherein the device for positioning the article at a predetermined angle of rotation cooperates with a device that rotates the article.

16. The system as claimed in claim 4, wherein the device for applying a magnetic mark is detachable.

17. A device for applying a magnetic mark to a rotatable article to be positioned for determining angles of rotation, comprising:

a ceramic plate being arranged at an end face of the device and positioned opposing a front face of the rotatable article and extending substantially perpendicular to an axis of rotation of the rotatable article;

a current-carrying conductor loop which is arranged in a linear groove in said ceramic plate and extending substantially parallel to a plate surface plane, said current carrying conductor loop being designed for generating in a front face region of the article comprising magnetizable material a single magnetic dipole, two poles of which are arranged symmetrically to a symmetry axis which coincides with the axis of rotation of the article.

18. A system for applying a magnetic mark to a rotatable article and for determining angles of rotation of said article, comprising:

a first device comprising a ceramic plate being arranged at an end face of the first device and positioned opposing a front face of the rotatable article and extending substantially perpendicularly to an axis of rotation of the rotatable article;

a current carrying conductor loop which is arranged in a linear groove in said ceramic plate and extending substantially parallel to a plate surface plane, said current-carrying conductor loop being designed for generating in the front face region of the rotatable article comprising magnetizable material a single magnetic dipole, two poles of which are arranged symmetrically to a symmetry axis which coincides with the axis of rotation of the article;

a second device comprising two mutually offset magnetic field sensors to be placed adjacent the front face of the rotatable article for generating analog signals in response to the magnetic dipole magnetized in the rotatable article;

a signal receiving and processing device connected to said magnetic field sensors and designed to determine any angle of rotation of the rotatable article from the analog signals.

19. The system as claimed in claim 18, wherein the two magnetic field sensors are mutually offset substantially by an angle of rotation of 90°.

* * * * *